Patented Aug. 21, 1945

2,383,205

UNITED STATES PATENT OFFICE 2,383,205

MANUFACTURE OF BUTADIENE

William J. Mattox, Riverside, Ill., assignor to Universal Oil Products Company, Chicago, Ill., a corporation of Delaware No Drawing. Application November 16, 1942, Serial No. 465,698

6 Claims. (Cl. 260—681)

This application is a continuation-in-part of copending application Serial No. 324,083 filed March 15, 1940.

The present invention relates to the manufacture of butadiene and is particularly concerned with a process whereby this compound can be made from the normal butane obtained incidental to the production of petroleum and from mixtures of normal butane and normal butenes obtained incidental to the thermal and catalytic cracking of petroleum hydrocarbons.

The present invention is related to the problem of producing synthetic rubber from cheap and readily available organic materials. It has already been shown that butadiene may be polymerized by metallic sodium or other catalysts to form an excellent synthetic rubber and the present invention is concerned with the production of the basic raw material by a special process.

One specific embodiment of the present invention comprises a process for the manufacture of butadiene by converting a butanediol to a butanediol diacetate and then decomposing the resulting diacetate into butadiene and acetic acid at from about 400° to about 600° C. by subjecting it to contact with an oxide of an element in the left-hand column of group IV of the periodic table.

It is well known in the art that normal butane may be converted to normal butenes either by direct thermal treatment or by the use of specific catalysts. These specific catalysts consist in general of alumina or other inert siliceous or refractory materials composited with the compounds and preferably the oxides of elements selected from those in the left-hand columns of groups IV, V and VI of the periodic table. The temperature used in such catalytic dehydrogenations will ordinarily range from 900° to 1200° F., while employing a pressure range from substantially atmospheric to 100 pounds or more per square inch super-atmospheric.

Butanediols may be readily prepared by treatment of butene-1 or butene-2 with hypochlorous acid to secure the corresponding chlorohydrin, subjecting this to the action of potassium hydroxide to obtain the alkene oxide and hydrating the latter with a dilute solution of a strong acid such as sulfuric or perchloric acid. Butanediols are readily converted to diacetates by reaction with acetic anhydride. This reaction takes place quite readily even in the absence of a catalyst.

In accordance with the present invention butanediol diacetates are decomposed to form butadiene and acetic acid by subjecting their vapors at temperatures within the range of from about 400° to about 600° C. to contact with catalysts comprising oxides of the elements in the left-hand column of group IV of the periodic table including titanium, zirconium, cerium, hafnium, and thorium. Under these conditions and the catalytic influence of the oxides, the diacetates decompose to form butadiene and acetic acid according to the following equation:

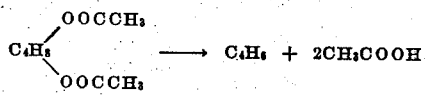

Butanediol diacetate    Butadiene    Acetic acid

It is obvious from the above typical equation that the formation of acetic acid in the reaction requires the abstraction of hydrogen from the butene group so that in effect the reaction is one of dehydrogenation of the butane radical catalyzed by the oxide. In this reaction there is no formation of metal acetates nor of any substantial amount of acetic anhydride, although minor quantities of carbon dioxide and acetone may be formed.

The preceding general description of the process and the reactions involved therein has been given in connection with the diacetates formed by interacting butanediols with acetic anhydride. However, in place of acetic anhydride, corresponding anhydrides of other monobasic aliphatic carboxylic acids can be used alternatively. The conditions employed in connection with these other fatty acids both in the manufacture of the butanediol acid addition products and in the decomposition of these products in contact with the preferred catalysts will vary with each acid used. The use of acetic anhydride is generally preferable on account of its greater availability and lower cost.

Of the oxides of titanium, zirconium, hafnium, and thorium which are alternatively utilizable with varying degrees of effectiveness in the step of decomposing the butanediol acetates, the oxides of zirconium and thorium have been found to have the highest catalytic activity under a given set of operating conditions, and owing to the relative cheapness and ease of preparation of these oxides, their use is usually preferred over those of the other members of the group. The oxides of the group IV elements specified may be used singly or in various admixtures and, if desired, on relatively inert supporting materials. The various oxides which may be used to catalyze the diacetate decompositions may be obtained from naturally occurring sources or may be produced by precipitating the hydrated oxides by the addition of basic precipitants to solutions of salts of the elements followed by washing to remove adsorbed and occluded impurities, heating to remove water, and forming in some manner granules which can be utilized in the so-called stationary bed operations. The prepared oxides may, if desired, be powdered and then pelleted or extruded by types of operations well-known.

The present process is preferably conducted in a continuous manner by passing the vapors of the diacetates over granular oxides in stationary beds at rates corresponding to the formation of maximum yields of butadiene which is readily separated from acetic acid due to the wide difference in their boiling points. The recovered acetic acid can then be converted into the anhydride and used for the further production of butanediol diacetates.

While butadiene may be readily manufactured in accordance with the present process by decomposing butanediol diacetates in the presence of the preferred catalyst, compounds of butanediol with other mono-carboxylic aliphatic acids may also be decomposed in the presence of the same catalyst with varying degrees of effectiveness to produce butadiene. Thus butanediol dipropionates and butanediol dibutyrates may be employed as well as similar compounds of higher molecular weight acids of this series.

The following example will illustrate the operation of the process and the results obtainable, although it is not intended to limit the scope of the method in exact correspondence with the data set forth.

One part by weight of 2,3-butanediol was treated with 2½ parts by weight of acetic anhydride at approximately 50° C., for a period of two hours. The greater portion of acetic acid formed in this reaction was then removed by distillation. The butanediol diacetate, which was not further purified, was decomposed by passing it in the vaporous state over granular zirconium oxide heated to a temperature of 485° C., using substantially atmospheric pressure and a liquid space velocity of two volumes per hour per volume of catalyst space. The acetic acid was recovered at 0° C. and it contained some dissolved butadiene which was separated by heating the acid and combined with the main portion of butadiene condensed at −78° C. The combined butadiene amounted to 75% of the theoretical yield and was over 90% 1,3-butadiene as shown by absorption in molten maleic anhydride.

I claim as my invention:

1. A process for producing butadiene which comprises subjecting a butanediol dialkanoate to contact with zirconium oxide at a temperature sufficient to convert it into butadiene and an alkanoic acid.

2. A process for producing butadiene which comprises subjecting a butanediol di-alkanoate at a temperature of from about 400 to about 600° C. to contact with zirconium oxide.

3. A process for producing butadiene which comprises subjecting a butanediol di-alkanoate at a temperature of from about 400 to about 600° C. and substantially atmospheric pressure to contact with zirconium oxide.

4. A process for producing butadiene which comprises subjecting a butanediol diacetate to contact with zirconium oxide at a temperature sufficient to convert it into butadiene and acetic acid.

5. A process for producing butadiene which comprises subjecting a butanediol diacetate to contact at a temperature of from about 400 to about 600° C. and substantially atmospheric pressure with zirconium oxide.

6. A process for producing butadiene which comprises contacting a butanediol di-acetate with zirconium oxide at a temperature of from about 400 to about 600° C.

WILLIAM J. MATTOX.